United States Patent Office 2,770,644
Patented Nov. 13, 1956

2,770,644

PURIFICATION OF ACRYLONITRILE

Marvin L. Owens, Jr., Texas City, Tex., assignor to Monsanto Chemical Company, St. Louis, Mo., a corporation of Delaware No Drawing. Application December 29, 1954,
Serial No. 478,541

5 Claims. (Cl. 260—465.9)

This invention relates to acrylonitrile and more specifically to a process for its purification.

Acrylonitrile is a well known article of commerce and is widely used in the preparation of various types of synthetic resins and fibers. It is also a valuable intermediate in the preparation of other organic compounds. In most applications, particularly when used in the preparation of synthetic resins or fibers, it is necessary that acrylonitrile of exceptional purity be used. Most of the processes used for the preparation of acrylonitrile simultaneously produce, in addition to acrylonitrile, minor amounts of carbonyl-containing compounds, particularly methyl vinyl ketone. Acrylonitrile containing minor quantities of methyl vinyl ketone is most unsatisfactory for many applications.

It is an object of this invention to provide a process for the purification of acrylonitrile.

It is a particular object of this invention to provide a process for the removal of minor amounts of methyl vinyl ketone from acrylonitrile.

Additional objects will become apparent from the description of the process of this invention.

It has now been discovered that the methyl vinyl ketone content of acrylonitrile containing minor amounts of methyl vinyl ketone can be substantially reduced by treating the thus contaminated acrylonitrile with a minor amount of hydroxylamine hydrochloride. The treatment can be carried out in any convenient manner. Acrylonitrile containing methyl vinyl ketone can be treated with an aqueous solution of hydroxylamine hydrochloride or acrylonitrile containing methyl vinyl ketone can be passed through a bed of solid hydroxylamine hydrochloride.

The following example illustrates the process of this invention:

*Example*

Approximately 50 grams of acrylonitrile containing approximately 700 p. p. m. of methyl vinyl ketone is poured through a 15-cm. bed of solid hydroxylamine hydrochloride contained in a 1-cm. inside diameter glass tube at a temperature of approximately 30° C. The acrylonitrile issuing from the bed of hydroxylamine hydrochloride on analysis is found to contain only 300 p. p. m. of methyl vinyl ketone.

The preceding example illustrates a particular embodiment of the novel process of this invention. Substantial variations in the conditions set forth are possible without departing from the scope of this invention. The reaction can be carried out by treatment of the acrylonitrile with either an aqueous solution of hydroxylamine hydrochloride or by treatment with the solid hydroxylamine hydrochloride. When an aqueous solution of hydroxlyamine hydrochloride is used, the concentration of hydroxylamine hydrochloride in the aqueous solution can be varied substantially as for example from 0.05% to 10%. Even higher concentrations can be used if desired. Treating acrylonitrile with an aqueous solution of hydroxylamine hydrochloride is conveniently accomplished by vigorously agitating a mixture of acrylonitrile with an aqueous solution of hydroxylamine hydrochloride, allowing the mixture to separate into two layers, separating the acrylonitrile layer from the reaction mixture and recovering substantially pure acrylonitrile therefrom by distillation. In addition to the procedure set forth in the example, the treatment with solid hydroxylamine hydrochloride can be carried out by merely slurrying hydroxylamine hydrochloride with acrylonitrile and separating acrylonitrile therefrom by filtration.

The quantity of hydroxylamine hydrochloride used is also subject to substantial variation and it is preferably employed in excess of that required to react with the methyl vinyl ketone contained in the acrylonitrile.

The treatment of acrylonitrile in accordance with the process of this invention can be carried out over a wide temperature range, varying from 0° C. to approximately 78° C., the boiling point of acrylonitrile. To prevent any substantial loss of acrylonitrile the reaction is preferably carried out at a temperature below about 40° C.

After the reaction is complete, substantially pure acrylonitrile can be recovered in any convenient manner well known to those skilled in the art. Distillation of the acrylonitrile from the reaction mixture affords a simple and economical method of recovery.

What is claimed is:

1. A process for the purification of acrylonitrile containing methyl vinyl ketone which comprises treating said acrylonitrile with a minor amount of hydroxylamine hydrochloride.

2. A process for the purification of acrylonitrile containing methyl vinyl ketone which comprises treating said acrylonitrile with an aqueous solution of hydroxylamine hydrochloride.

3. The process as described in claim 2 wherein the treatment is carried out at a temperature below about 40° C.

4. A process for the purification of acrylonitrile containing methyl vinyl ketone which comprises treating said acrylonitrile with a minor amount of solid hydroxylamine hydrochloride.

5. A process for the purification of acrylonitrile containing methyl vinyl ketone which comprises treating said acrylonitrile with a minor amount of solid hydroxylamine hydrochloride at a temperature below about 40° C.

References Cited in the file of this patent

UNITED STATES PATENTS

| | | |
|---|---|---|
| 2,494,087 | Daniels | Jan. 10, 1950 |
| 2,678,945 | Taylor | May 18, 1954 |